Dec. 10, 1968

L. F. PHARISS 3,414,950

ECCENTRIC PIPE WELDING CLAMP

Filed April 3, 1967

INVENTOR.
LEON PHARISS

BY Head & Johnson

ATTORNEYS

Dec. 10, 1968  L. F. PHARISS  3,414,950
ECCENTRIC PIPE WELDING CLAMP
Filed April 3, 1967  2 Sheets-Sheet 2
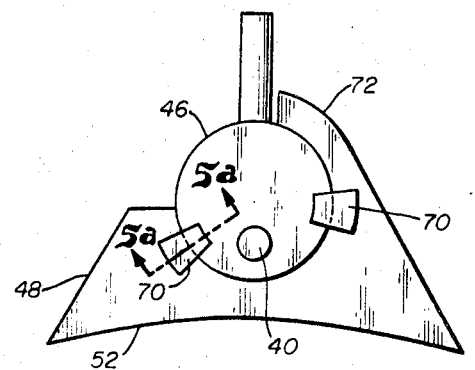
Fig.5.
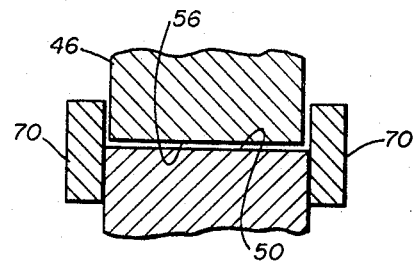
Fig.5a.
Fig.6.
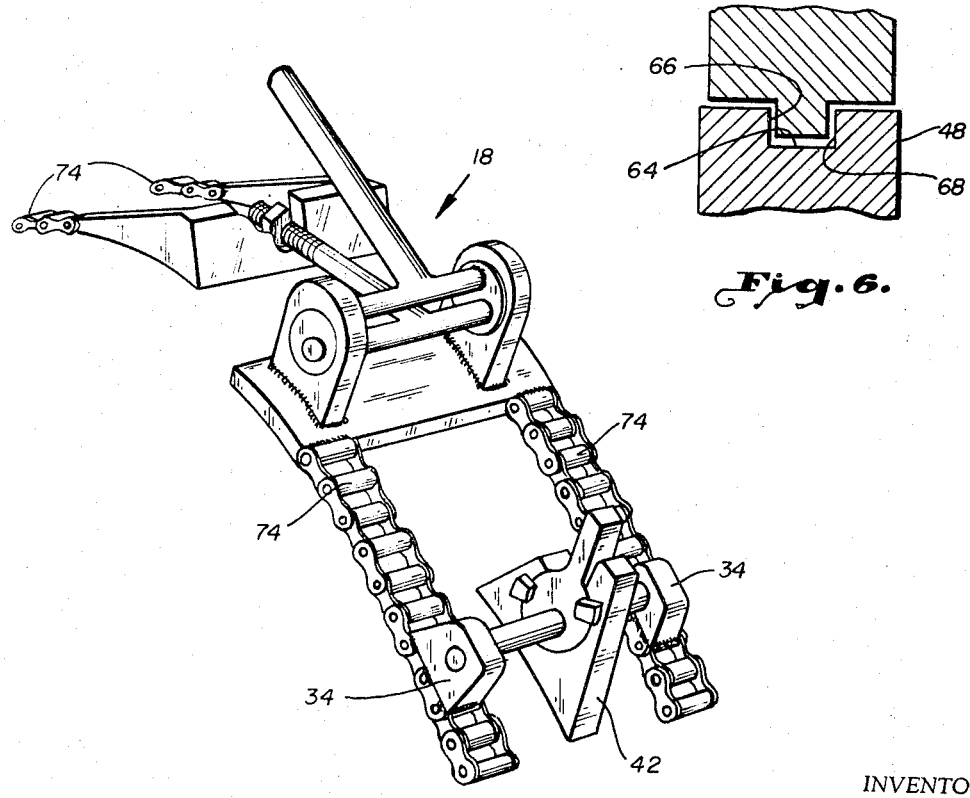
Fig.7.
INVENTOR.
LEON PHARISS
BY
ATTORNEYS

United States Patent Office 3,414,950
Patented Dec. 10, 1968

3,414,950
ECCENTRIC PIPE WELDING CLAMP
Leon F. Phariss, 2001 N. Mingo Road,
Tulsa, Okla. 74116
Filed Apr. 3, 1967, Ser. No. 627,784
17 Claims. (Cl. 24—280)

ABSTRACT OF THE DISCLOSURE

This invention relates to a clamp for holding adjacent pipeline sections in stable coaxial arrangement with the ends of the adjacent pipeline sections substantially abutting during welding operations. A body component of the clamp encircles each of the pipeline sections. An eccentric component is positionable slidably between each of the two body components so that the eccentric component may be positioned against a chosen portion of one of the pipe sections as needed to bring the pipe sections into suitable arrangement.

Brief summary of the invention

This invention relates to pipe clamps, and more particularly, to a pipe clamp used for aligning and rigidly holding sections of pipe preparatory to and during welding operations. In the laying of a pipeline the consecutive pipe sections are held in close coaxial alignment by various means while the pipe sections are welded together. Quite often the adjacent pipe section ends are not capable of being properly aligned because one or the other of the pipe sections is slightly out of round or contains a high spot which does not properly align with the adjacent pipe section. Pipe clamps are known which hold the adjacent pipe sections in rigid alignment and employ a clamping force to match an out of round section with a properly circular pipe section. Generally, these clamps comprise circular body portions which are clamped around the pipe section to provide a force which is applied equally to all portions of the circumference of the pipe section. A structure which will permit the application of additional force to a particular small area of the pipeline surface is usually not available.

A primary object of this invention is to provide a pipeline clamp for holding adjacent sections of pipeline in proper coaxial alignment so that the ends thereof may be easily and efficiently welded.

Another object of this invention is to provide a pipe clamp of the character described which is simple to manufacture, inexpensive, and easy to use.

Still another object of this invention is to provide a pipe clamp which is useful in holding pipe sections in proper coaxial alignment preparatory to and during welding operations and which is adjustable during use.

Still another object of this invention is to provide a pipe clamp useful in holding pipe sections in proper alignment which is capable of providing additional force to chosen areas of the pipe sections being held.

Further objects and advantages of the invention will become apparent from the following description and claims, and from the accompanying drawings.

Brief description of the drawings

FIGURE 3 is a fragmentary sectional view along the lines 3—3 of FIGURE 2.

FIGURE 5a is a cross-sectional view along the lines 5a—5a of FIGURE 5.

FIGURE 6 is a fragmentary cross-sectional view of an alternate embodiment of an adjustable component of the invention similar to the view in FIGURE 3.

FIGURE 7 is a fragmentary perspective view of another embodiment of a pipeline clamp according to this invention showing modified pipe section encircling means.

Detailed description of the drawings

Figure 1:
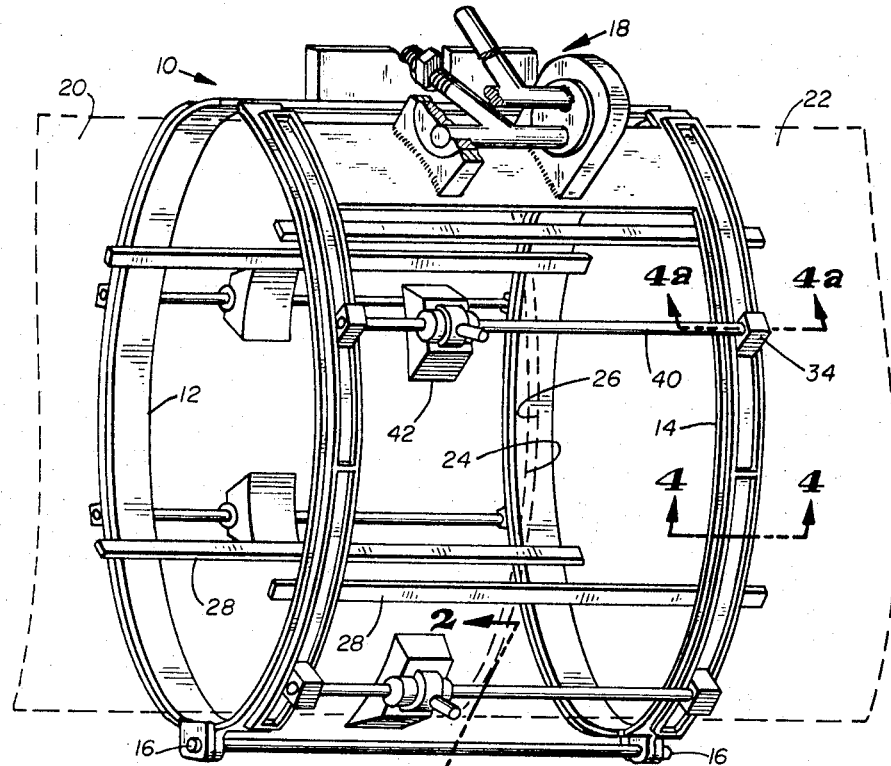
FIGURE 1 is a perspective view of a pipeline clamp according to this invention in position around adjacent pipe sections with the pipe sections being shown in phantom.
Figure 4:
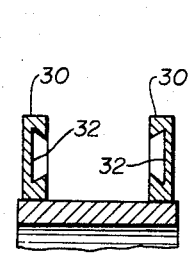
FIGURE 4 is a cross-sectional view along the lines 4—4 of FIGURE 1.
Figure 4A:
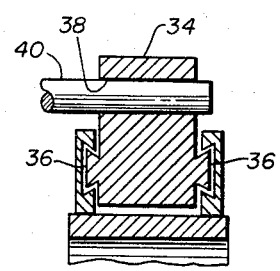
FIGURE 4a is a cross-sectional view along the lines 4a—4a of FIGURE 1.

Referring now to the drawings in detail, a pipe clamp, generally 10, includes a pair of annular members 12 and 14 which are identical and which each include a hinge 16 and a conventional clamp 18. Annular body members 12 and 14 are oriented so that each hinge 16 operates in the same axis and each latch 18 is also positionable so that its keeper member is coaxial with the keeper member on the other body member 12. Thus, in use, body members 12 and 14 are positioned around adjacent pipe sections 20 and 22 shown in phantom and held lockably in place so that pipe section ends 24 and 26 are substantially abutting. Body members 12 and 14 are held in spaced relationship around the respective pipe sections by means of a series of spacing bars 28 holding each respective hinged portion of the body members in rigid alignment. In the embodiment shown in FIGURE 1, each body member 12 and 14 is substantially a hinged strap and includes on its outer circumference a peripheral track shown in cross-section in FIGURE 4. The peripheral track shown in FIGURES 1 and 4 preferably extends from a position near each hinge through a position adjacent each latch member 18, and as shown in FIGURE 4, includes a pair of parallel upstanding rails 30 with each rail 30 having an inner slot 32 positioned so that slots 32 face each other. Slots 32 may be of rectangular, trapezoidal, or curved cross-section, but a trapezoidal cross-section as shown in FIGURE 4 is preferred because this configuration adds strength and stability to the track structure and to a bracket component which rides slidably in the track. Then, as shown in FIGURE 4a, rails 30 and tracks 32 provide a means for retaining in slidable position a guide member 34 which has side extensions 36 and a transverse passageway 38 through which rod member 40 is passed in rotatable arrangement.

Figure 4B:
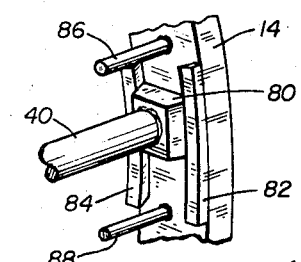
FIGURE 4b is a partial perspective view of an alternate embodiment.

In the embodiment of FIGURE 4b rod member 40 is slidably retained between body members 12 and 14 by a slide block 80 retained between guides 82 and 84 and limited in its travel by upper and lower stop pins 86 and 88.

Figure 2:
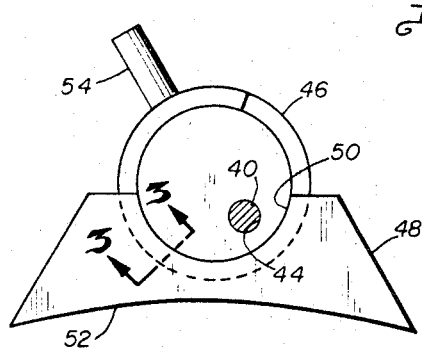
FIGURE 2 is a side view of an adjustable component of the invention along the lines 2—2 of FIGURE 1.

Positioned slidably on rod member 40 is an eccentric adjusting component 42, shown more clearly in FIGURES 2 and 3, and positioned on rod member 40 by means of the passage of rod 40 through a transverse bore 44 in eccentric 46. As shown in FIGURE 2, bore 44 is off-center with respect to eccentric 46. Eccentric 46 moves slidably arcuately in shoe member 48 which shoe member has a first arcuate surface 50 abutting eccentric 46, and a second arcuate surface 52 which becomes positionable against either one of the pipe sections 20 or 22 when the pipe clamp is in use. Thus, eccentric adjusting component 42 can be slid along rod member 40 to be positioned over either pipe section 20 or 22. Then, handle 54 can be moved arcuately to cause eccentric 46 to rotate around rod 40 so that the space between rod 40 and the surface of the particular pipe section abutting surface 52 can be increased as needed to provide additional force against the pipe section, or can be decreased to release the shoe 48 from tight engagement. As shown in FIGURES 2 and 3, first arcuate surface 50 of shoe 48 slidably contacts a peripheral surface 56 of eccentric 46 whether or not shoe 48 includes an annular track in which a peripheral track on eccentric 46 slides. But, preferably, shoe 48 includes an annular track as shown in FIGURES 3 and 6 in which a peripheral track of eccentric 46 is positioned. In FIGURE 3 a trapezoidal form of track is disclosed in which shoe 48 includes an indented surface 58 jointed by adjacent wall portions 60 and 62. It can be seen that with a trapezoidal form of track eccentric 46 is effectively locked in to prevent sidewise movement of eccentric 46 relative to shoe 48. FIGURE 6 discloses a rectangular form of track in which shoe 48 includes an indented surface 64 bounded by upstanding wall portions 66 and 68.

Figure 5:
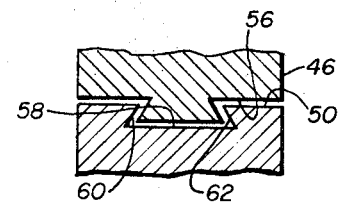
FIGURE 5 is a cross-sectional view of another embodiment of an adjustable component of a pipe clamp according to this invention.

In FIGURES 5 and 5a is shown another embodiment of the invention in which an alternate form of eccentric member and shoe member is disclosed. FIGURES 5 and 5a show two components of the invention which may be added to the form of eccentric and shoe member shown in FIGURE 1. In the embodiment disclosed in FIGURE 1, shoe member 48 may slide sideways beneath eccentric 46 and thus be easily removable. In the embodiments of FIGURES 5 and 5a shoulder members 70 may be welded to each side of shoe 48 to prevent sideways movement of eccentric 46 if desired. Also, in the embodiment of FIGURE 1, eccentric 46 is free to move radially away from shoe 48 when rod member 40 is released from brackets 34. In FIGURE 5 shoe member 48 is shown to have an arcuately extending lip 72 which will prevent radial removal of eccentric 46 from shoe 48 and will also provide additional leverage for maintaining shoe 48 in position against a pipe section. Thus, if it is chosen to employ shoulder members 70 and lip 72 with the embodiment of shoe and eccentric shown in FIGURE 1, eccentric 46 is effectively held in position in a non-removable position with respect to shoe 48. It can be seen that, too, a lip 72 may be employed in conjunction with the embodiment of eccentric 46 and shoe 48 shown in FIGURE 6 to prevent relative radial movement of the eccentric and shoe. Although shoulder 70 should not be necessary with the embodiment described in FIGURE 6, shoulder 70 may be employed where additional stability of the eccentric and shoe is desired. It can be seen that in the embodiment of FIGURE 1 with shoe member 48 contacting eccentric 46 arcuately over an arc of 180° or less eccentric 46 is radially removable. Thus, while lip 72 is provided on shoe 48 to give an arcuate contact of eccentric 46 and shoe 48 of greater than 180°, radially removable of eccentric 46 is prevented. By radial removal of eccentric 46 is meant the movement of eccentric 46 along a radius of the circle of which arcuate surface 50 is a portion.

FIGURE 7 describes another alternate embodiment of the invention in which chains 74 are substituted for annular body members 12 and 14. Again, conventional latch members 18 are employed to secure each chain member 74 around its respective pipe section. Guide members 34 are then secured to chain 74 and a rod member 40 and eccentric adjusting component 42 are provided similar to the embodiment described above. With this alternate embodiment of the invention comprising chain member 74, adjusting eccentric 42 may be employed in any of the alternate forms disclosed in FIGURES 2, 3, 5, 5a, or 6 as described above.

The principles of this invention are also applicable to fluid actuated clamp devices positioned internally of the pipe sections.

I claim:

1. A pipe welding clamp comprising:
a first body member removably positionable around the external periphery of a first section of pipe,
a second body member removably positionable around the external periphery of a second section of pipe, said first and said second pipe sections being adjacent each other in substantial coaxial alignment,
a rod member in parallel alignment with the longitudinal axis of said pipe sections and attachable by a first end to said first body member and attachable by a second end to said second body member,
a cylindrical eccentric member slidably positioned on said rod member by passage of said rod member through an offset bore in said eccentric member,
a shoe member positionable between said eccentric and one of said pipe sections, said shoe member having a first arcuate surface abutting said eccentric peripherally and a second arcuate surface positionable against said pipe section.

2. A pipe welding clamp as described in claim 1 wherein:
said first body member is a hinged strap, said second body member is a hinged strap, and said hinged straps are lockable around said first and said second pipe sections respectively.

3. A pipe clamp as described in claim 2 wherein:
said first and second hinged straps each include a peripheral track, and
said rod member has adjacent each end a guide member which is slidably received in said track.

4. A pipe clamp as described in claim 2 wherein:
said eccentric includes a handle extending radially from said eccentric for rotating said eccentric around said rod.

5. A pipe clamp as described in claim 4 wherein:
said shoe includes an annular track formed in said first arcuate surface, and
said eccentric includes a peripheral track slidably engaging said annular track of said shoe.

6. A pipe clamp as described in claim 5 wherein:
said annular track in said shoe is of substantially rectangular cross-section and said peripheral track of said eccentric is of substantially rectangular cross-section.

7. A pipe clamp as described in claim 6 wherein:
said first arcuate surface of said shoe abuts said eccentric peripherally in a manner that the extremities of said first arcuate surface describe and arc of greater than 180°.

8. A pipe clamp as described in claim 7 wherein:
a spacing bar is disposed between said first and second hinged straps, said spacing bar substantially parallel to the longitudinal axis of said pipe sections.

9. A pipe clamp as described in claim 8 wherein:
said first and second hinged straps each include a peripheral track, and
said rod member has adjacent each end a guide member which is slidably received in said track.

10. A pipe clamp as described in claim 5 wherein:
said annular track in said shoe is of trapezoidal cross-section and said peripheral track of said eccentric is of trapezoidal cross-section.

11. A pipe clamp as described in claim 10 wherein:
a spacing bar is disposed between said first and second hinged straps, said spacing bar substantially parallel to the longitudinal axis of said pipe sections.

12. A pipe clamp as described in claim 11 wherein:
said first and second hinged straps each include a peripheral track, and
said rod member has adjacent each end a guide member which is slidably received in said track.

13. A pipe clamp as described in claim 1 wherein:
said first body member includes a chain portion, said second body member includes a chain portion, and said first and said second body members are lockable around said first and second pipe sections respectively.

14. A pipe clamp as described in claim 13 wherein:
said eccentric includes a handle extending radially from said eccentric for rotating said eccentric around said rod.

15. A pipe clamp as described in claim 14 wherein:
said shoe includes an annular track formed in said first arcuate surface, and
said eccentric includes a peripheral track slidaly engaging said annular track of said shoe.

16. A pipe clamp as described in claim 15 wherein:
said annular track in said shoe is of substantially rectangular cross-section and said peripheral track of said eccentric is of substantially rectangular cross-section.

17. A pipe clamp as described in claim 15 wherein:
said annular track in said shoe is of trapezoidal cross section and said peripheral track of said eccentric i of trapezoidal cross-section.

References Cited
UNITED STATES PATENTS

| | | | |
|---|---|---|---|
| 2,108,077 | 2/1938 | Robinson | 269—4: |
| 2,187,878 | 1/1940 | Hill et al. | 269—4: |
| 3,166,664 | 1/1965 | Paton et al. | 219—161 XR |

DONALD A. GRIFFIN, *Primary Examiner.*

U.S. Cl. X.R.

219—161; 269—43